UNITED STATES PATENT OFFICE.

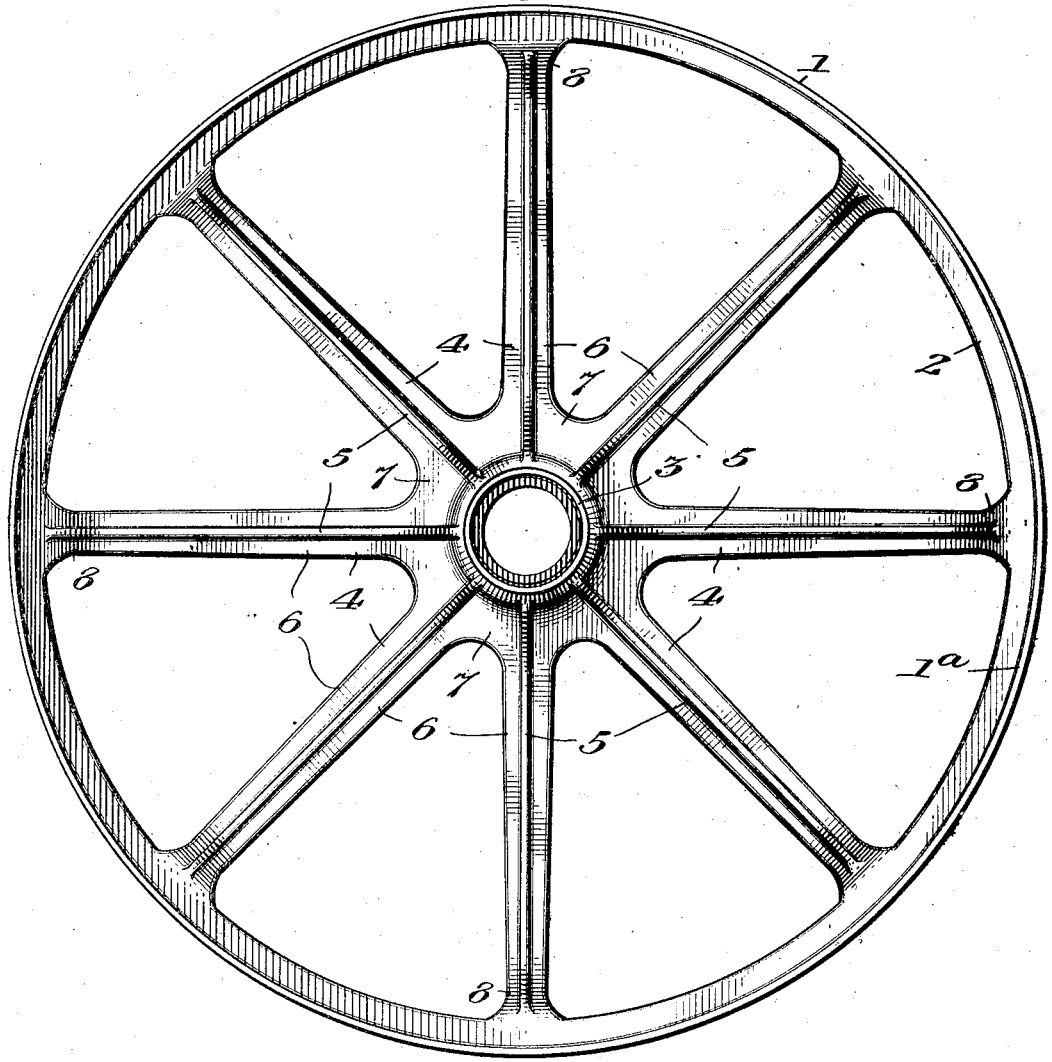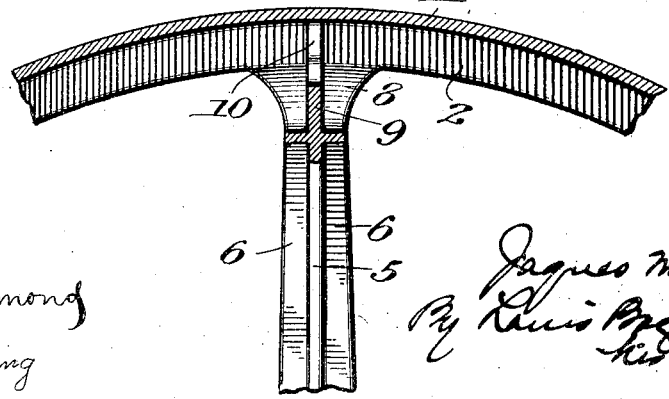

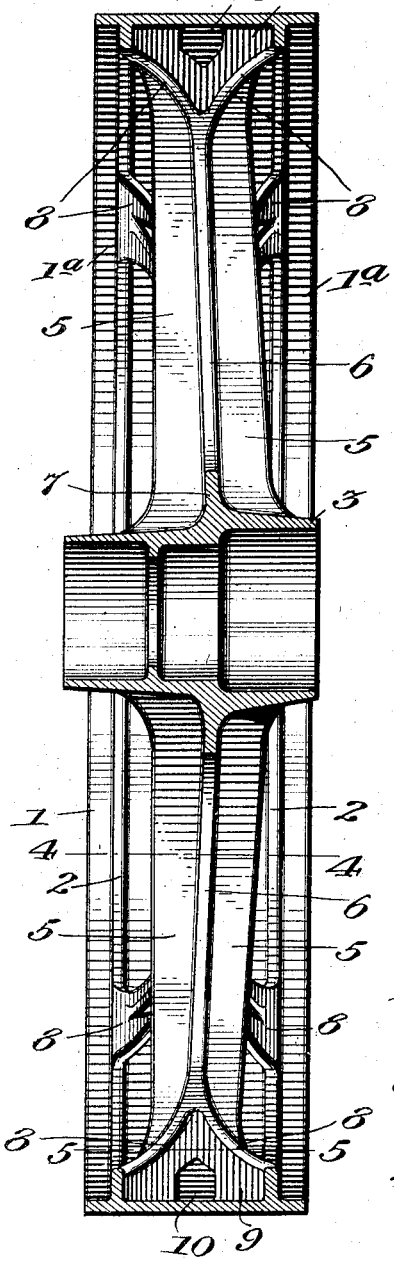
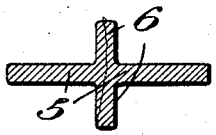
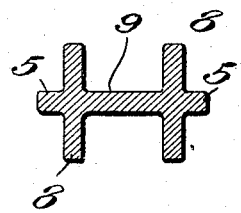
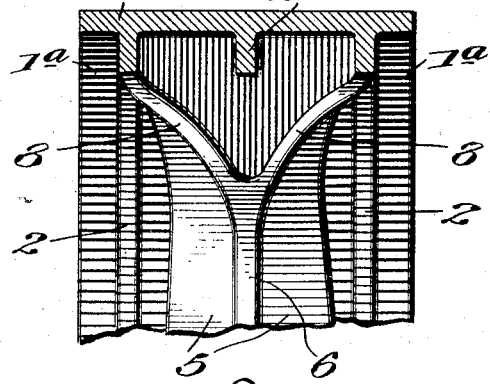

JACQUES MORAT, OF YONKERS, NEW YORK, ASSIGNOR TO ISAAC G. JOHNSON & CO., OF SPUYTEN DUYVIL, NEW YORK, N. Y., A CORPORATION OF NEW YORK.

VEHICLE-WHEEL.

1,090,743. Specification of Letters Patent. Patented Mar. 17, 1914.

Application filed February 28, 1913. Serial No. 751,267.

*To all whom it may concern:*

Be it known that I, JACQUES MORAT, a citizen of the Republic of France, residing at Yonkers, in the county of Westchester and State of New York, have invented certain new and useful Improvements in Vehicle-Wheels, of which the following is a specification.

My invention relates to an improvement in vehicle wheels, and more particularly to cast metal wheels constructed for use on vehicles carrying a heavy load, as for instance automobile trucks and the like. With the wheels of this type now in use, it has been found that the full efficiency of the wheel is not to be obtained as the connection between the spokes and rim lacks strength; and further that in casting these wheels, as the rim to attain the greatest strength should be made channel-shape or with reëntrant flanges, a combination of cores and molds must be used. When setting up the molds and cores it is practically impossible to be assured that they are in alinement, and as a result the castings come out of the sand with fins at the point of juncture between the core and mold, or it is found that there is a shift in the spoke at this point.

The object of my invention is to provide a wheel with a channel-shaped rim and spokes which are cross-shaped in section, and to form a connection between the rim and spokes so braced that the ribs of the spokes join with the body of the rim and with the reëntrant flanges in such combination that each part counterbraces the other parts and the greatest strength is disposed at the point of greatest stress.

A further object is to construct the wheel and all of its parts in such a manner that there will be little likelihood of the castings showing fins, and all danger of a shift in the cores and molds affecting the strength of the wheel will be precluded.

In the accompanying drawings:—Figure 1 is a view in side elevation of the wheel, Fig. 2 is a transverse vertical sectional view, Fig. 3 is an enlarged detail view of a portion of the rim with parts broken away more clearly to illustrate the connection between the spokes and rim, Fig. 4 is a sectional view on the line 4—4 of Fig. 2, Fig. 5 is a sectional view on the line 5—5 of Fig. 2, and Fig. 6 is a transverse sectional view to show a slightly modified form of rim.

The rim 1 is made substantially channel-shaped with the flanges 2, 2, extending inwardly toward the hub 3, or reëntrant. As illustrated, the rim 1 projects on each edge at 1ª slightly beyond the flanges 2, 2, but it is evident that the flanges might be positioned on the extreme edges of the rim. The hub 3 may be cored out to fit the axle on which the wheel is mounted, or a bearing may be fitted to the bore of the hub. This feature will be determined by the use to which the wheel is to be put.

A plurality of spokes 4 are joined with and extend radially from the hub 3. These spokes comprise ribs 5 and 6 arranged to extend approximately at right angles to each other so that the spokes in transverse section are cross-shaped. The ribs 6 of two adjoining spokes 4 are preferably joined by a web 7, so that the ribs 6 at their point of union with the hub 3 are practically continuous. The ribs 5 are joined with the hubs 3 in the usual manner by fillets. As the spokes 4 approach to their point of union with the rim 1, the rib 6 is divided and has two branches 8, 8, (as better shown in Fig. 2). The branches 8 extend outwardly and are joined with the upper inner edges of the flanges 2, and the ribs 5 are joined on the branches 8 of the ribs 6 by fillets of such a radius that the ribs 5 run into the surface of the branches 8 at or near their point of union with the fillets of the rim.

While the structure as described forms a very rigid connection between the spokes and rim, it is preferable that a filler-block 9 be formed (as better shown in Figs. 2 and 3) in the space surrounded by the rim 1, the reentrant flanges 2 and the branches 8 of the spoke. This filler-block is positioned approximately in alinement with the ribs 5 of the spoke 4, and if it is desired may be made in the form of a truss by providing an opening 10 adjacent the rim 1.

In the modified form (shown in Fig. 6), the structure of the rim, the spoke and the union between the two is essentially the same, but in this instance the rim 1 is further braced by having a central flange 2ª provided on its inner circumference to extend in a direction parallel with the flanges 2. The rim on its outer face may be shaped to receive any form of tire, or the tread may be roughened and the same arrangement of parts yet maintained.

In the form of the wheel as described, it is requisite that the rim on its inner face be formed on cores, as the reëntrant flanges make it practically impossible to use a mold. A core which is so constructed as to fit between two spokes and to be removed therefrom after the casting can be used to form the rim and its reëntrant flanges. It is found, however, that it is desirable to cast the remainder of the spoke and the hub in the mold. This mold, it will of course be understood, will extend to the core, and will form the ribs 5 and 6 and outer faces of the branches 8 of the ribs 6. In this way the point of juncture between the core and mold is on the rim along the edge of the reëntrant flange and on the spoke along the edges of the branches 8. From this it will be seen that there will be no fins formed anywhere but at the points of juncture, and that shifting at those points would not materially change the arrangement or strength of the parts, the filler-block 9 being the only part which would be re-positioned, and, as the bearing against this filler-block would be substantially the same at any point along the circumferential extent of the branches 8, the strength would not be affected.

It will thus be seen that I have provided a wheel structure in which the rim and spokes are of a form to attain the greatest strength and the most advantageous disposition of the metal used, and the union between the rim and spokes is so formed that each part is braced and counterbraced by the other parts.

Having fully described my invention, what I claim as new and desire to secure by Letters Patent, is:

1. A metal wheel comprising a rim, a hub, spokes joined with the hub, said spokes formed of ribs arranged to be cross-shaped in transverse section, and one of said ribs positioned to lie in a plane parallel to the plane of rotation of the wheel and branched out to unite with the rim near the edges thereof in a parallel plane and brace the rim transversely.

2. A cast-metal wheel comprising a rim having reëntrant flanges adjacent the edges thereof, a hub, a plurality of spokes formed integral with the hub to extend radially therefrom, said spokes composed of ribs so arranged as to be cross-shaped in transverse section, one of said ribs positioned to lie in a plane parallel to the plane of rotation of the wheel and divided adjacent the rim in its direction of longitudinal extent to form branches, said branches joined with the reëntrant flanges of the rim to extend in the direction of the circumferential extent of the flanges, the other of said ribs formed to reinforce and brace said branches from the outside, and a filler-block formed within the branches and the rim approximately in alinement with said second rib to brace the structure as described.

In testimony whereof I affix my signature, in the presence of two witnesses.

JACQUES MORAT.

Witnesses:
F. WALTER BLACKEBY,
FREDERIC H. WARING.

---

Copies of this patent may be obtained for five cents each, by addressing the "Commissioner of Patents, Washington, D. C."